United States Patent [19]

Fuse et al.

[11] Patent Number: 4,591,724
[45] Date of Patent: May 27, 1986

[54] CURING APPARATUS

[75] Inventors: Yoshiro Fuse; Takao Naganuma; Akiyoshi Fujimori, all of Chofu; Kozo Arai, Chuo; Katsutoshi Igarashi, Chuo; Yuzi Naito, Chuo, all of Japan

[73] Assignees: Japan Synthetic Rubber Co., Ltd.; ORC Manufacturing Co., Ltd., both of Tokyo, Japan

[21] Appl. No.: 708,578

[22] Filed: Mar. 5, 1985

[30] Foreign Application Priority Data

Mar. 7, 1984 [JP] Japan .................... 59-43185

[51] Int. Cl.$^4$ .............................................. G21K 5/02
[52] U.S. Cl. ............................ 250/492.1; 250/504 R; 250/454.1
[58] Field of Search ............. 250/493.1, 504 R, 492.1, 250/453.1, 454.1, 455.1; 34/4

[56] References Cited

U.S. PATENT DOCUMENTS 3,983,039 9/1976 Eastland .......................... 250/492.1
4,208,587 6/1980 Eastlund et al. .................. 250/492.1

Primary Examiner—Bruce C. Anderson
Assistant Examiner—Jack I. Berman
Attorney, Agent, or Firm—Stevens, Davis, Miller & Mosher

[57] ABSTRACT

A curing apparatus utilizing ultraviolet radiation for curing a coating over the surface of a line-shaped medium such as an optical fiber, comprising: a pair of reflecting mirrors, each of which has an elliptical mirror surface, the ratio between the major and minor axes of which is within a range from 1.02 to 1.35; a source for producing ultraviolet radiation having a tube which is disposed along a first focal axis of the pair of reflecting mirrors for emitting ultraviolet radiation and has a diameter within a range from 12 mm to 24 mm and a light emission length equal to or longer than 15 cm; and an ultraviolet radiation transmission hollow tube which is disposed along a second focal axis of the pair of reflecting mirrors and through which the line shaped medium is passed in the axial direction of the hollow tube. The ultraviolet radiation emitting tube is air-cooled. The coating is cured in a stable and efficient manner, regardless of the thickness of the coating at a high or low transportation speed of the line-shaped medium.

9 Claims, 5 Drawing Figures

CURING APPARATUS

BACKGROUND OF THE INVENTION

1. Field of the Invention

The present invention relates to a curing apparatus of ultraviolet radiation type and more particularly to an apparatus for curing an ultraviolet-radiation-curable resin coated over the surface of a line-shaped medium by the continuous irradiation of ultraviolet radiation. More specifically, the present invention relates to an apparatus for curing an ultraviolet-radiation-curable resin coated over the surface of an optical fiber drawn into a fine line.

2. Description of the Prior Art

One of the apparatus for curing by irradiating ultraviolet radiation now available on the market is an apparatus manufactured by Fusion Systems Corporation, MD, U. S. A. The apparatus has a magnetron which excites a discharge lamp having no electrode to emit ultraviolet radiation. This apparatus is provided with a cavity having an elliptical reflecting mirror. The discharge lamp is disposed along a first focal axis of the elliptical reflecting mirror, so that the lamp is excited by microwaves transmitted from the magnetron. The ultraviolet radiation emitted from the discharge lamp is reflected by the reflecting mirror toward its second focal axis. A line-shaped medium such as an optical fiber is disposed along the second focal axis, so that the reflected ultraviolet radiation is focused on the medium. As a result, an ultraviolet radiation-curable resin coated over the surface of the line-shaped medium is cured.

Japanese patent application Laying-Open No. 55-152567 discloses a curing apparatus of ultraviolet radiation type as shown in FIGS. 1 and 2. In this apparatus, a source for irradiating ultraviolet radiation is disposed along a first focal axis of an elliptical reflecting mirror and a line-shaped medium coated with ultraviolet radiation (UV) resin which is cured by ultraviolet radiation is disposed to pass a second focal axis of the reflecting mirror. Therefore, ultraviolet radiation is focused on the surface of the line-shaped medium so that the coated ultraviolet radiation resin is cured.

More particularly, referring to FIG. 1, reflecting mirrors 1A and 1B are accommodated in a housing 2. Each of the reflecting mirrors 1A and 1B has an elliptical mirror surface having a first focal axis 3 and a second focal axis 4. A source for irradiating ultraviolet radiation such as a high-pressure mercury lamp 3A is disposed along the first focal axis in such a way that the axis of the lamp 3A coincides with the first focal axis. A transparent quartz tube 4A is disposed along the second focal axis in such a way that the axis of the quartz tube 4A coincides with the second focal axis.

Therefore, ultraviolet rays emitted from the lamp 3A to all directions are focused on the surface of a line-shaped medium 5 such as an optical fiber passing through the quartz tube 4A in the axial direction thereof.

A gas such as nitrogen gas not containing oxygen is introduced into the quartz tube 4A through a pipe 6 so that adverse effects of oxygen upon the passing medium 5 is prevented when the ultraviolet radiation resin is cured in the quartz tube 4A. The line-shaped medium 5 coated with an ultraviolet radiation resin is transported through the quartz tube 4A from a supply tube 7 shown in FIG. 2 at a predetermined speed.

The curing apparatus further comprises a blower 8 and an exhaust fan 9 so that the reflecting mirrors 1A and 1B and the ultraviolet radiation source 3A are prevented from being raised to high temperatures. That is, air is forcibly circulated by the blower 8 and the exhaust fan 9 for cooling the inside of the reflecting mirrors 1A and 1B. The ultraviolet radiation lamp 3A is connected to a power supply (not shown) through a terminal 10.

In the case of a curing apparatus of the type utilizing a magnetron, an electrode-less lamp is used as the source of ultraviolet radiation, so that the ultraviolet radiation source has a long lifetime and it is possible to reduce the diameter of the ultraviolet radiation source. However, the position of the ultraviolet radiation source is inevitably determined depending upon conditions to form a cavity as a part of magnetron, while the second focal axis of the opposite reflecting mirror is determined depending upon conditions as a reflecting mirror. As a result, the distance between the first and second focal points becomes long, so that ultraviolet rays are not sharply focused at a point in the vicinity of the second focal point.

Furthermore, in order to provide the ultraviolet radiation source over a predetermined distance in the direction in which the line-shaped medium 5 is transported, a plurality of magnetrons must be disposed in the transportation direction. Moreover, these magnetrons as well as the source of ultraviolet radiation must be cooled. As a result, the curing apparatus becomes large in size.

As described above, according to Japanese patent application Laying-Open No. 55-152567, the ultraviolet radiation source 3 is disposed at the first focal point 3 in the manner described above and the line-shaped medium 5 is positioned to pass through the quartz tube 4A at the second focal point 4 in the manner described above. The results of the extensive studies and experiments conducted by the inventors show that the energy of ultraviolet radiation focused on the surface of the line-shaped medium 5 is dependent upon the angles of reflection and incidence. Furthermore, some ellipsoidal reflecting mirrors cannot satisfactorily converge the energy of ultraviolet radiation. As a result, there arise the problems that a resin coating cannot be cured uniformly and that the curing rate is relatively slow.

In order to increase the curing rate, a plurality of ultraviolet radiation sources must be provided and it is necessary to device counter-measures for improving the focusing efficiency of the ultraviolet rays. For instance, the angles of reflection and incidence must be suitably adjusted. The reflecting mirrors must be coated with a special coating material so as to increase their reflectivity. However, in view of the limitations imposed by the volume and weight of a curing apparatus, the cost thereof and the lifetime and stability of the ultraviolet radiation source, such counter-measures as described above cannot attain satisfactory result.

SUMMARY OF THE INVENTION

The present invention is to overcome the above and other problems encountered in the conventional curing apparatus of ultraviolet radiation type.

One of the objects of the present invention is, therefore, to provide a curing apparatus of ultraviolet radiation type in which the geometry of reflecting mirrors is so selected that the energy emitted from an ultraviolet radiation source disposed between the reflecting mirrors can be uniformly converged over the whole surface of line-shaped medium such as an optical fiber.

Another object of the present invention is to provide a curing apparatus of ultraviolet radiation type in which the geometry and size of an ultraviolet radiation source are so composed that ultraviolet radiation emitted from the source can be focused on the whole surface of a medium as uniformly as possible.

A further object of the present invention is to provide a curing apparatus of ultraviolet radiation type in which the vicinity of an ultraviolet radiation source, elliptic reflecting mirrors and a medium to be irradiated by the ultraviolet rays are cooled in an efficient manner.

In order to achieve the above objects, in one aspect of the present invention, a curing apparatus utilizing ultraviolet radiation for curing a coating over the surface of a line-shaped medium, comprises:

a pair of reflecting mirrors, each having an elliptical mirror surface, and the ratio between the major and minor axes of the elliptical mirror surfaces of the pair of reflecting mirrors being within a range from 1.02 to 1.35;

a source for producing ultraviolet radiation, the source having a tube disposed along a first focal axis of the pair of reflecting mirrors for emitting ultraviolet radiation; and a hollow tube which is disposed along a second focal axis of the pair of reflecting mirrors and through which the line shaped medium is passed in the axial direction of the hollow tube the hollow tube allowing the transmission of ultraviolet ray.

The curing apparatus may further comprise means for air-cooling the tube of the ultraviolet radiation source.

The curing apparatus may further comprise:

means for air-cooling the tube of the ultraviolet radiation source, and wherein:

the pair of reflecting mirrors have elliptical mirror surfaces which are symmetrical with respect to a plane including the first and second focal axes;

the pair of reflecting mirrors are spaced apart from each other so that a first gap is defined between the pair of reflecting mirrors on the side of a first focal axis thereof and a second gap is defined between the pair of reflecting mirrors on the side of a second focal axis thereof;

the pair of reflecting mirrors are accommodated in a housing;

the second gap is communicated with an exhaust duct;

the housing has a cooling air inlet port; and cooling air which is introduced into the housing through the cooling air inlet port is directed through the first gap to the space defined between the pair of reflecting mirrors so as to cool the tube of the ultraviolet radiation source and the hollow tube and then is discharged into the exhaust duct through the second gap.

In a second aspect of the present invention, a curing apparatus utilizing ultraviolet radiation for curing a coating over the surface of a line-shaped medium, comprises:

a pair of reflecting mirrors, each having an elliptical mirror surface;

a source for producing ultraviolet radiation, the source having a tube disposed along a first focal axis of the pair of reflecting mirrors for emitting ultraviolet radiation, the diameter of the tube being within a range from 12 mm to 24 mm and the light emission length of the tube being equal to or longer than 15 cm; and a hollow tube for transmitting ultraviolet radiation which is disposed along a second focal axis of the pair of reflecting mirrors and through which the line shaped medium is passed in the axial direction of the hollow tube.

The curing apparatus may further comprise means for air-cooling the tube of the ultraviolet radiation source.

The curing apparatus may further comprise:

means for air-cooling the tube of the ultraviolet radiation source, and wherein:

the pair of reflecting mirrors have elliptical mirror surfaces which are symmetrical with respect to a plane including the first and second focal axes;

the pair of reflecting mirrors are spaced apart from each other so that a first gap is defined between the pair of reflecting mirrors on the side of a first focal axis thereof and a second gap is defined between the pair of reflecting mirrors on the side of a second focal axis thereof;

the pair of reflecting mirrors are accommodated in a housing;

the second gap is communicated with an exhaust duct;

the housing has a cooling air inlet port; and cooling air which is introduced into the housing through the cooling air inlet port is directed through the first gap to the space defined between the pair of reflecting mirrors so as to cool the tube of the ultraviolet radiation source and the hollow tube and then is discharged into the exhaust duct through the second gap.

In a third aspect of the present invention, a curing apparatus utilizing ultraviolet radiation for curing a coating over the surface of a line-shaped medium, comprises:

a pair of reflecting mirrors, each having an elliptical mirror surface, and the ratio between the major and minor axes of the elliptical mirror surfaces of the pair of reflecting mirrors being within a range from 1.02 to 1.35;

a source for producing ultraviolet radiation, the source having a tube disposed along a first focal axis of the pair of reflecting mirrors for emitting ultraviolet radiation, the diameter of the tube being within a range from 12 mm to 24 mm and the light emission length of the tube being equal to or longer than 15 cm; and a hollow tube which is disposed along a second focal axis of the pair of reflecting mirrors and through which the line shaped medium is passed in the axial direction of the hollow tube the hollow tube allowing the transmission of ultraviolet ray.

The curing apparatus may further comprise means for air-cooling the tube of the ultraviolet radiation source.

The curing apparatus may further comprise:

means for air-cooling the tube of the ultraviolet radiation source, and wherein:

the pair of reflecting mirrors have elliptical mirror surfaces which are symmetrical with respect to a plane including the first and second focal axes;

the pair of reflecting mirrors are spaced apart from each other so that a first gap is defined between the pair of reflecting mirrors on the side of a first focal axis thereof and a second gap is defined between the pair of reflecting mirrors on the side of a second focal axis thereof;

the pair of reflecting mirrors are accommodated in a housing;

the second gap is communicated with an exhaust duct;

the housing has a cooling air inlet port; and cooling air which is introduced into the housing through the cooling air inlet port is directed through the first gap to the space defined between the pair of reflecting mirrors so as to cool the tube of the ultraviolet radiation source and the hollow tube and then is discharged into the exhaust duct through the second gap.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 1:
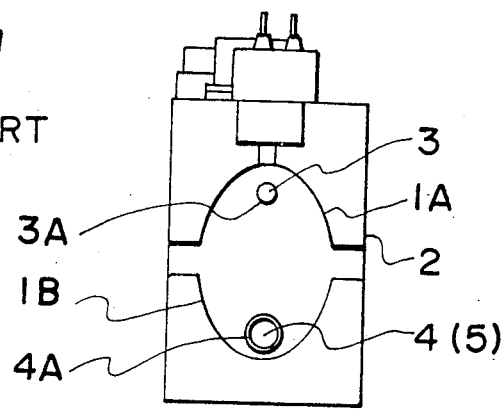
FIGS. 1 and 2 are schematic longitudinal and sectional views, respectively, showing a conventional curing apparatus of ultraviolet radiation type.
Figure 2:
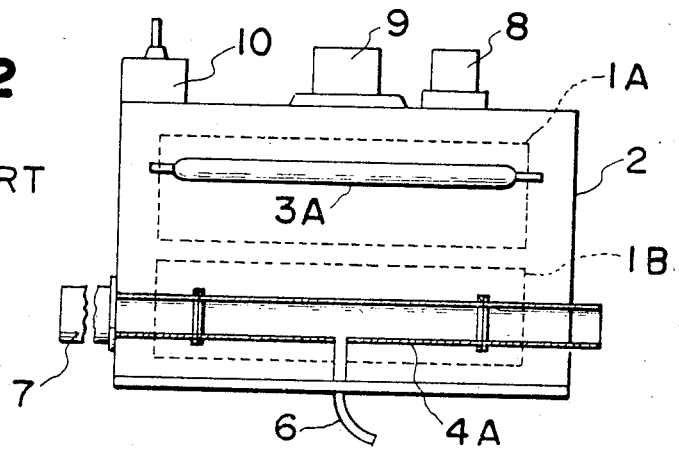
Figure 3:
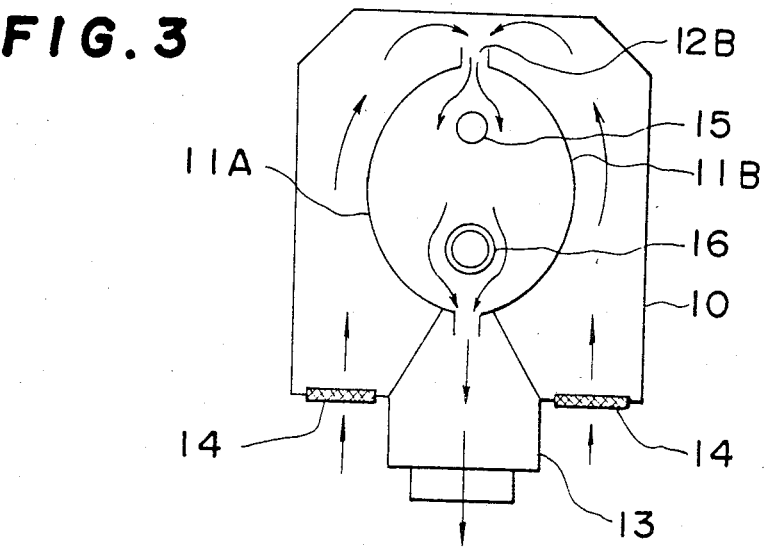
FIG. 3 is a schematic sectional view showing an embodiment of a curing apparatus of ultraviolet radiation type in accordance with the present invention.
Figure 4:
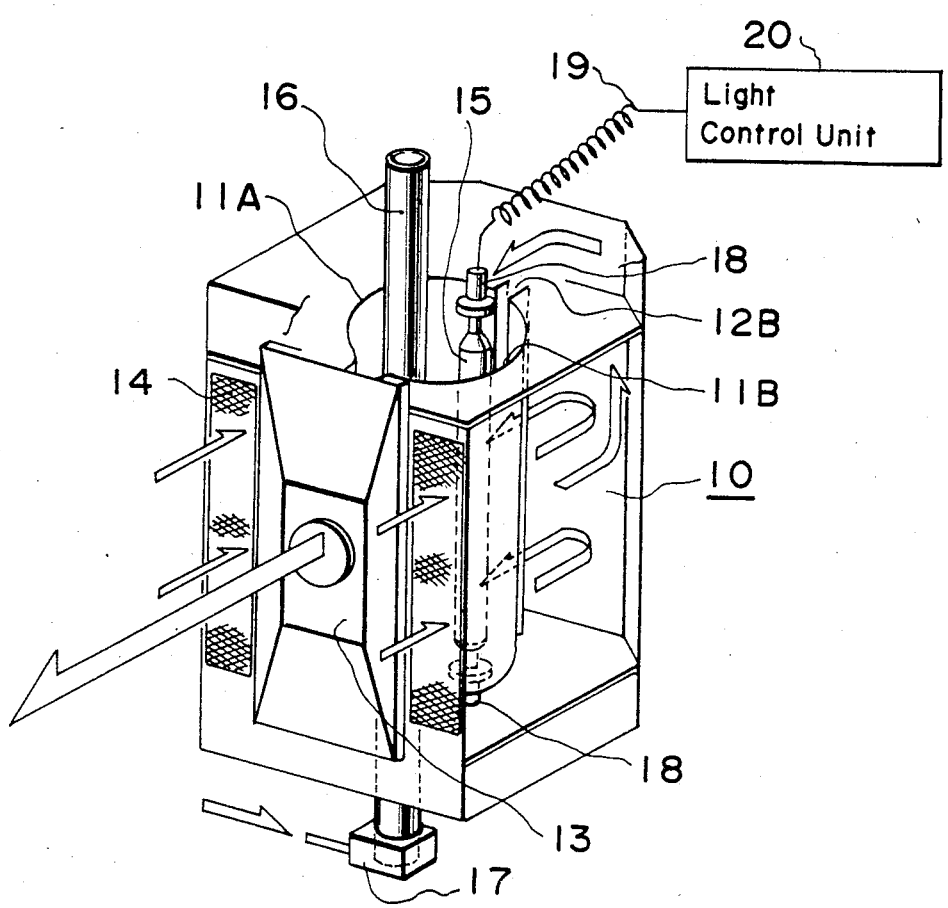
FIG. 4 is a perspective view thereof with a part broken away.

Referring to FIGS. 3 and 4 showing an embodiment of the present invention, reference numeral 10 denotes a housing in which elliptical reflectors 11A and 11B are accommodated. The elliptical reflectors 11A and 11B are disposed opposite to each other and spaced apart from each other by a suitable distance, so that narrow gaps 12A and 12B are defined between the elliptical reflectors 11A and 11B.

Here, it is to be noted that the reflectors 11A and 11B form one elliptical mirror surfaces other than the portions of the narrow gaps 12A and 12B. In other words, the imaginary mirror surfaces corresponding to the gaps 12A and 12B and the reflectors 11A and 11B form one elliptical mirror surface. The reflectors 11A and 11B are not formed by merely dividing one elliptical mirror surface into two parts.

The gap 12A is communicated with an exhaust duct 13 and the gap 12B is communicated with the interior of the housing 10. Cooling air is introduced through air filters 14 disposed at the bottom of the housing 10, the inner space of the housing 10 and the gap 12B into the space defined by the elliptic reflecting mirrors 11A and 11B to cool an UV (ultraviolet) lamp 15. The UV lamp can be, for instance, an air cooled high pressure mercury lamp or an air cooled metal vapor discharge lamp in which mercury and metal other than mercury are charged. The UV lamp 15 is disposed in such a way that the axis of the UV lamp 15 coincides with the first focal axis of the elliptic reflecting mirrors 11A and 11B. A hollow tube 16 which allows the transmission of ultraviolet ray is disposed in such a way that the axis of the tube 16 coincides with the second focal axis of the elliptical reflecting mirrors 11A and 11B.

The air which was used to cool the ultraviolet lamp 15, as an ultraviolet radiation source and the hollow tube 16 is discharged through the exhaust duct 13 from the housing 10.

An ultraviolet resin is coated over the surface of a line-shaped medium such as optical fiber (not shown) which is to be transported along the axis of the hollow tube 16. In order to cool the ultraviolet resin under stable conditions, as best shown in FIG. 4, a nitrogen gas purging block 17 is attached to one end of the hollow tube 16 extended downwardly from the housing 10, so that a cooling nitrogen gas is introduced into the hollow tube 16. The line-shaped medium or optical fiber which is transported through the hollow tube 16 at a high velocity while the medium is irradiated by ultraviolet rays is cooled safely and smoothly.

Reference numeral 18 represents a mounting base of the ultraviolet lamp 15 and reference numeral 19 denotes, a power supply line for supplying an electrical power from a light control unit 20 to the ultraviolet lamp 15.

The inventors conducted extensive experiments and confirmed that there exists a very close relationship between the ratio between the major and minor axes of the reflecting mirrors 11A and 11B, each having an elliptical inner mirror surface and the distribution of the energy of ultraviolet radiation converged over the ultraviolet resin coated over the line-shaped medium or optical fiber.

That is, according to the experimental results, it is confirmed that when the ratio between the major and minor axes of an ellipse which defines the mirror surfaces of the reflecting mirrors 11A and 11B is within a range from 1.02 to 1.35, the energy of ultraviolet radiation converged over the ultraviolet resin coated over the line-shaped medium or optical fiber is substantially uniformly distributed, since the angles of incidence of ultraviolet rays varies little.

If the ratio is greater than 1.35, the energy of ultraviolet radiation irradiated over the surface of the line-shaped medium or optical fiber is not unformly distributed. That is, the energies imparted to the surface of the line-shaped medium or optical fiber by the irradiation of ultraviolet radiation vary over a wide range from one point to another depending upon the angles of incidence of ultraviolet rays. As a result, hardness of the cured ultraviolet resin coated over the surface of the line-shaped medium or optical fiber varies from one point to another.

On the other hand, if the ratio is lower than 1.02, the distance between the first and second focal points is shortened so that an amount of ultraviolet rays which directly impinge the surface of the line-shaped medium or optical fiber is increased abruptly and consequently the ultraviolet resin is remarkably influenced by the increased thermal energy. As a result, the ultraviolet resin coated over the surface of the line-shaped medium or optical fiber is deteriorated or carbonized.

Figure 5:
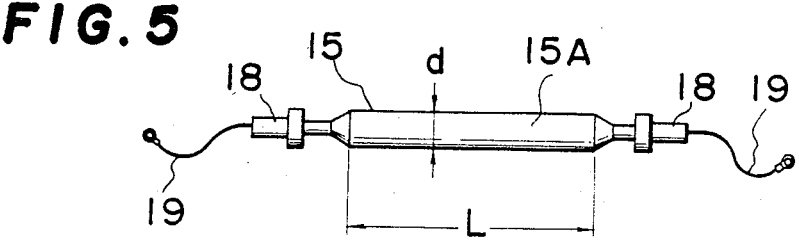
FIG. 5 is an explanatory diagram view used to explain the size of an ultraviolet radiation source thereof.

It is required that the ultraviolet resin coated over the surface of the line-shaped medium or optical fiber which is transported at a high velocity through the hollow tube 16 is irradiated with strong ultraviolet radiation. To this end, it is necessary to increase the efficiency of ultraviolet ray collection of the elliptical reflecting mirrors 11A and 11B. For this purpose, the diameter of a light emitting tube 15A of the ultraviolet lamp 15 is reduced. According to the present invention, satisfactory results was obtained when the outer diameter d (See FIG. 5) of the light emitting tube 15A of the ultraviolet lamp 15 is 12 mm≦d≦24 mm and the light emission length L is 15 cm≦L.

When the outer diameter d of the light emitting tube 15A of the ultraviolet lamp 15 was greater than 12 mm, the ultraviolet ray collection efficiency was increased, but the light emitting tube 15A made by quartz of the ultraviolet lamp 15 become less transparent after the quartz tube 15A is used for a long time period and accordingly the lifetime of the ultraviolet lamp 15 was shortened. In order to overcome these problems, it was necessary to decrease the input power to the ultraviolet lamp 15. As a result, the energy of irradiated ultraviolet radiation was decreased.

On the other hand, when the outer diameter d of the light emitting quartz tube 15A of the ultraviolet lamp 15 was greater than 24 mm, the efficiency of collecting emitted ultraviolet rays was decreased. As a result, the ultraviolet resin, to which the ultraviolet rays were irradiated, was cured efficiently.

When the light emission length L of the ultraviolet lamp 15 was less than 15 cm, a continuous curing process was not attained because of light ripples of the ultraviolet lamp 15 energized by an AC power source.

In the case of curing an ultraviolet resin coated over the surface of a bundle consisting of a few to tens optical fibers, the ultraviolet resin coating is thick. As a result, it is necessary that the ultraviolet resin is cured at a relatively low curing rate. In this case, in a conventional source of ultraviolet radiation, the coated resin is deteriorated, carbonized and vaporized not only by the energy of the emitted ultraviolet radiation but also by the thermal energy. In order to obviate these problems, in the present invention, there is provided the light control unit 20 as shown in FIG. 4 for controlling an input electrical power to the ultraviolet lamp 15, so that an ultraviolet resin coating is irradiated with an optimum energy and the input electrical power to the ultraviolet lamp 15 is reduced to about ½.

In a specific embodiment of the present invention, the major and minor axes of the elliptical mirror surfaces of the reflecting mirrors 11A and 11B were 130 mm and 120 mm, respectively. Therefore, the ratio between the major and minor axes was 1.083. The ultraviolet lamp 15 in the form of a metal vapor discharge lamp having the light emitting quartz tube 15A having an outer diameter of 15 mm and a light emission length of 25 cm was disposed along the first focal axis of the reflecting mirrors 11A and 11B. The quartz hollow tube 16 through which the optical fiber is passed was disposed along the second focal axis of the reflecting mirrors 11A and 11B. In addition, a nitrogen ($N_2$) gas was introduced into the housing 10 through the air filters 14 so as to cool the ultraviolet resin and to prevent the ultraviolet resin from being oxidized.

Under these conditions, the ultraviolet resin coated over the surface of an optical fiber having a diameter of 125 μm was cured. In this case, the optical fiber was coated with two resin coatings. One curing apparatus utilizing ultraviolet radiation in accordance with the present invention was used after the primary coating was formed and then two curing apparatuses in accordance with the present invention which are arranged in cascade were used after the second coating is formed. The ultraviolet resin coated over the surface of the optical fiber which is transported at a high velocity of 500 m/min was satisfactorily cured.

Furthermore, in case of one thick ultraviolet resin coated over an optical fiber, the resin was satisfactorily cured at a relatively low velocity of 30 m/min without coloring, deterioration, carbonization and vaporization of the resin by controlling the input electrical power to the ultraviolet lamp 15 to 1.8 kW by the light control unit 20.

As described above, the curing apparatus of ultraviolet radiation type in accordance with the present invention cures a resin coating with the irradiation of ultraviolet ray of an optical fiber in a stable and efficient manner, regardless of the thickness of the coated resin at a transportation velocity of the optical fiber in a wide range from a high speed to a low speed. Therefore, optical fibers are fabricated at a high speed in an inexpensive manner.

What is claimed is:

1. A curing apparatus utilizing ultraviolet radiation for curing a coating over the surface of a line-shaped medium, comprising:

a pair of reflecting mirrors, each having an elliptical mirror surface, and the ratio between the major and minor axes of said elliptical mirror surfaces of said pair of reflecting mirrors being within a range from 1.02 to 1.35 , and said elliptical mirror surfaces are symmetrical with respect to a plane including first and second focal axes of said reflecting mirrors;

a source for producing ultraviolet radiation, said source having a tube disposed along a first focal axis of said pair of reflecting mirrors for emitting ultraviolet radiation; and a hollow tube which is disposed along a second focal axis of said pair of reflecting mirrors and through which said line shaped medium is passed in the axial direction of said hollow tube said hollow tube allowing the transmission of ultraviolet ray.

2. A curing apparatus as claimed in claim 1, further comprising means for air-cooling said tube of said ultraviolet radiation source.

3. A curing apparatus as claimed in claim 1, further comprising:

means for air-cooling said tube of said ultraviolet radiation source, and wherein:

said pair of reflecting mirrors are spaced apart from each other so that a first gap is defined between said pair of reflecting mirrors on the side of a first focal axis thereof and a second gap is defined between said pair of reflecting mirrors on the side of a second focal axis thereof;

said pair of reflecting mirrors are accommodated in a housing;

said second gap is communicated with an exhaust duct;

said housing has a cooling air inlet port; and cooling air which is introduced into said housing through said cooling air inlet port is directed through said first gap to the space defined between said pair of reflecting mirrors so as to cool said tube of said ultraviolet radiation source and said hollow tube and then is discharged into said exhaust duct through said second gap.

4. A curing apparatus utilizing ultraviolet radiation for curing a coating over the surface of a line-shaped medium, comprising:

a pair of reflecting mirrors, each having an elliptical mirror surface, which are symmetrical with respect to a plane including first and second focal axes of said reflecting mirrors;

a source for producing ultraviolet radiation, said source having a tube disposed along a first focal axis of said pair of reflecting mirrors for emitting ultraviolet radiation, the diameter of said tube being within a range from 12 mm to 24 mm and the light emission length of said tube being equal to or longer than 15 cm; and a hollow tube for transmitting ultraviolet radiation which is disposed along a second focal axis of said pair of reflecting mirrors and through which said line shaped medium is passed in the axial direction of said hollow tube.

5. A curing apparatus as claimed in claim 4, further comprising means for air-cooling said tube of said ultraviolet radiation source.

6. A curing apparatus as claimed in claim 4, further comprising:

means for air-cooling said tube of said ultraviolet radiation source, and wherein:

said pair of reflecting mirrors are spaced apart from each other so that a first gap is defined between said pair of reflecting mirrors on the side of a first focal axis thereof and a second gap is defined between said pair of reflecting mirrors on the side of a second focal axis thereof;

said pair of reflecting mirrors are accommodated in a housing;

said second gap is communicated with an exhaust duct;

said housing has a cooling air inlet port; and cooling air which is introduced into said housing through said cooling air inlet port is directed through said first gap to the space defined between said pair of reflecting mirrors so as to cool said tube of said ultraviolet radiation source and said hollow tube and then is discharged into said exhaust duct through said second gap.

7. A curing apparatus utilizing ultraviolet radiation for curing a coating over the surface of a line-shaped medium, comprising:

a pair of reflecting mirrors, each having an elliptical mirror surface, and the ratio between the major and minor axes of said elliptical mirror surfaces of said pair of reflecting mirrors being within a range from 1.02 to 1.35, and said elliptical mirror surfaces are symmetrical with respect to a plane including first and second focal axes of said reflecting mirrors;

a source for producing ultraviolet radiation, said source having a tube disposed along a first focal axis of said pair of reflecting mirrors for emitting ultraviolet radiation, the diameter of said tube being within a range from 12 mm to 24 mm and the light emission length of said tube being equal to or longer than 15 cm; and a hollow tube which is disposed along a second focal axis of said pair of reflecting mirrors and through which said line shaped medium is passed in the axial direction of said hollow tube said hollow tube allowing the transmission of ultraviolet ray.

8. A curing apparatus as claimed in claim 7, further comprising means for air-cooling said tube of said ultraviolet radiation source.

9. A curing apparatus as claimed in claim 7, further comprising:

means for air-cooling said tube of said ultraviolet radiation source, and wherein:

said pair of reflecting mirrors are spaced apart from each other so that a first gap is defined between said pair of reflecting mirrors on the side of a first focal axis thereof and a second gap is defined between said pair of reflecting mirrors on the side of a second focal axis thereof;

said pair of reflecting mirrors are accommodated in a housing;

said second gap is communicated with an exhaust duct;

said housing has a cooling air inlet port; and cooling air which is introduced into said housing through said cooling air inlet port is directed through said first gap to the space defined between said pair of reflecting mirrors so as to cool said tube of said ultraviolet radiation source and said hollow tube and then is discharged into said exhaust duct through said second gap.

* * * * *